United States Patent [19]

Fesman

[11] Patent Number: 4,477,600

[45] Date of Patent: Oct. 16, 1984

[54] POLYURETHANE FOAMS HAVING LOW SCORCH DISCOLORATION

[75] Inventor: Gerald Fesman, Teaneck, N.J.

[73] Assignee: Stauffer Chemical Company, Westport, Conn.

[21] Appl. No.: 535,086

[22] Filed: Sep. 23, 1983

[51] Int. Cl.$^3$ ............................................. C08G 18/14
[52] U.S. Cl. .................................... 521/108; 252/182; 521/107; 521/121
[58] Field of Search ...................... 521/107, 121, 108; 252/182

[56] References Cited

U.S. PATENT DOCUMENTS

| | | | |
|---|---|---|---|
| 4,130,513 | 12/1978 | Reale et al. | 521/107 |
| 4,143,219 | 3/1979 | Hensch | 521/107 |
| 4,146,687 | 3/1979 | Reale | 521/107 |
| 4,178,420 | 12/1979 | Reale | 521/107 |
| 4,196,268 | 4/1980 | Brown et al. | 521/107 |
| 4,235,975 | 11/1980 | Preston et al. | 521/107 |
| 4,324,865 | 4/1982 | Reale | 521/107 |

*Primary Examiner*—Herbert S. Cockeram
*Attorney, Agent, or Firm*—Roger S. Benjamin

[57] ABSTRACT

Polyurethane foams prepared with halogenated phosphoric acid flame retardant have low scorch and surface discoloration when prepared in the presence of a composition containing phenothiazine, 4,4'-thio-bis-(6-tertiary butyl meta cresol), and organophosphite.

17 Claims, No Drawings

POLYURETHANE FOAMS HAVING LOW SCORCH DISCOLORATION

FIELD OF THE INVENTION

This invention relates to flame retarded polyurethane foams. In particular, this invention concerns additives which minimize scorch and surface discoloration in polyurethane foams flame retarded with halogenated phosphoric acid esters.

BACKGROUND OF THE INVENTION

Polyurethane foams are typically prepared in large buns which are cured and sliced into sections for uses such as cushions, etc. A problem particularly in summer months is that heat of reaction in the center of the bun is not adequately dissipated and may result in scorching or loss of desirable physical characteristics. Moreover, scorching problems are frequently aggravated by the presence of halogenated phosphate ester type flame retardants.

U.S. Pat. No. 4,143,219 discloses the use of phenothiazine to reduce scorch discoloration in polyurethane foams containing halogenated phosphate ester flame retardants.

U.S. Pat. No. 4,324,865 discloses the use of phenothiazine in combination with 4,4'-thio-bis-(6-tertiary butyl meta cresol) to reduce scorch discoloration in polyurethane foams containing halogenated phosphate ester flame retardants.

The foams, foam making methods and flame retarding compositions disclosed in U.S. Pat. Nos. 4,143,219 and 4,324,865 were improvements over prior art practice. Nevertheless, it is desirable to develop even more effective scorch and discoloration resistant agents.

SUMMARY OF THE INVENTION

This invention is a process for making flame retardant polyurethane foams which have low scorch and surface discoloration. This invention also comprises the flame retardant polyurethane foams produced by the process of this invention. In addition, this invention comprises a composition for flame retarding polyurethane foams while imparting desirable scorch and surface color properties.

The objects of this invention are attained by flame retarding polyurethane foams with a composition containing (A) phenothiazine, (B) 4,4'-thio-bis-(6-tertiary butyl meta cresol), (C) organophosphite, and (D) halogenated phosphoric acid ester flame retardant.

DETAILED DESCRIPTION OF THE INVENTION

The essential ingredients of the polyurethane foam making method and the polyurethane foam of this invention are (1) conventional polyurethane foam forming reactants, (2) halogenated phosphoric acid ester flame retardants, (3) phenothiazine, (4) 4,4'-thio-bis-(6-tertiary butyl meta cresol), and (5) organophosphite.

The essential ingredients of the composition for flame retarding polyurethane foams according to this invention are (A) phenothiazine, (B) 4,4'-thio-bis-(6-tertiary butyl meta cresol), (C) organophosphite, and (D) halogenated phosphoric acid ester flame retardant.

The conventional polyurethane foam forming ingredients of the method of this invention are polyfunctional isocyanates in combination with hydroxyl-bearing compounds and blowing agent. Conventional polyurethane foams and foam forming systems are described in the Encyclopedia of Chemical Technology 3'd Ed., (Kirk-Othmer) Vol. 11, pgs. 87–89, 1980, ISBN 0-471-02064-8; the text of which is incorporated herein by reference.

The halogenated phosphoric acid ester flame retardant is selected from conventional polyurethane flame retardant agents.

Examples of suitable flame retardants are:

tris-(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(chloromethyl)-1,3 propylene bis-di(2-chloroethyl)phosphate, bis(dichloropropyl)tribromoneopentyl phosphate, tetrakis(2-chloroethyl)ethylene diphosphate, liquid poly(haloethylethyleneoxy)phosphoric acid ester which may be prepared by the reaction of ethanol, 2-chlorophosphate, $P_2O_5$ and ethylene oxide, or by the methods disclosed in U.S. Pat. Nos. 3,513,644 and 3,896,187, or mixtures thereof.

A preferred halogenated phosphoric acid ester flame retardant ingredient is tris(dichloropropyl)phosphate.

The flame retardant ingredient is employed in polyurethane forming systems and polyurethane products in flame retardant effective amounts. An "effective amount" of flame retardant may be determined by testing a foam sample in a standard flame retardancy test such as the U.S. Department of Transportation Motor Vehicle Safety Standard 302, "Flammability of Interior Materials, Cars, Trucks, and Multiple Purpose Passenger Vehicles, Buses". Generally, flame retardant is employed from about 3 to 20 weight percent of the total weight of the polyurethane foam or polyurethane foam forming ingredients.

The use of phenothiazine in polyurethane foam formulations containing halogenated phosphoric acid ester flame retardants is described in U.S. Pat. Nos. 4,143,219, and 4,324,865, the disclosures of which are incorporated herein by reference. Phenothiazine is used in a polyurethane foam formulation in an amount effective to reduce scorch. Generally, phenothiazine is used at a level of from about 0.10 to about 5.0 weight percent of the weight of halogenated phosphoric acid ester flame retardant.

The quantity of 4,4'-thio-bis-(6-tertiary butyl meta cresol) used in the practice of this invention is from about 0.10 to about 5.0 weight percent of the halogenated phosphoric acid ester flame retardant and is also related to the quantity of phenothiazine used. 4,4'-thio-bis-(6-tertiary butyl meta cresol) is combined with phenothiazine in a proportion effective to reduce scorch below the level attainable by the use of a comparable quantity of phenothiazine used alone. Generally useful phenothiazine to 4,4'-thio-bis-(6-tertiary butyl meta cresol) weight ratios are in a range from about 1:3 to about 3:1 with a ratio of about 1:1 being particularly preferred.

The organophosphite ingredient of the invention may be selected from any organic compound having phosphite functionality. Suitable organophosphites include those represented by the formula:

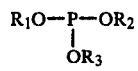

wherein $R_1$, $R_2$, and $R_3$ are the same or different and are each selected from hydrogen or hydrocarbyl organic radicals having 1 to about 20 carbon atoms, with the proviso that only one of $R_1$, $R_2$ or $R_3$ may be hydrogen.

Suitable classes of organophosphites include alkyl phosphites, aryl phosphites, alkylaryl phosphites, and mixtures thereof. Specific phosphites suitable for use in this invention are tridecyl phosphite, didecyl hydrogen phosphite, triphenyl phosphite, diphenyl phosphite, tris nonylphenyl phosphite, didecyl monophenyl phosphite, monodecyl diphenyl phosphite, and mixtures thereof.

An effective amount of organophosphite used in this invention is typically from about 0.10 to about 5.0 weight percent of the halogenated phosphoric acid ester flame retardant and is also related to the sum of the weight of phenothiazine and 4,4'-thio-bis-(6-tertiary butyl meta cresol) essential ingredients. Generally useful weight ratios of organophosphites to the sum of the weight of phenothiazine and 4,4'-thio-bis-(6-tertiary butyl meta cresol) are in the range of from about 1:6 to about 1:5:1 with a ratio of about 1:2 being particularly preferred.

It is a discovery of this invention that the phenothiazine, 4,4'-thio-bis-(6-tertiary butyl meta cresol), and organophosphite essential ingredients act in synergistic combination to reduce scorch and surface discoloration in foams containing halogenated phosphoric acid ester flame retardants.

Various optional ingredients may be used in addition to the essential ingredients of the invention. A useful class of supplemental ingredients are epoxides which act as acid acceptors in the foam formulation. Epoxides used at levels of the essential ingredients enhance the stability of the scorch reducing system. Suitable epoxides may be monoepoxides or diepoxides such as 3,4-epoxycycloalkyl 3,4 epoxycycloalkyl carboxylate or the alkylene oxides set out in Col. 2 of U.S. Pat. No. 3,959,414.

The essential ingredients of the invention may be combined in the absence of the foam forming composition to provide a foam formulation additive composition for flame retarding polyurethane foams. This additive composition is prepared by simply mixing the phenothiazine; 4,4'-thio-bis-(6-tertiary butyl meta cresol); organophosphite; and halogenated phosphoric acid ester flame retardant.

The relative proportions of essential ingredients in the foam formulation additive composition are the same as those employed in the foam forming formulation. Specifically, the composition for flame retarding polyurethane foam comprises a mixture of the following essential ingredients:
(A) about 0.1 to about 5.0 weight percent phenothiazine;
(B) about 0.1 to about 5.0 weight percent 4,4'-thio-bis-(6-tertiary butyl meta cresol);
(C) about 0.1 to about 5.0 weight percent organophosphite; and
(D) about 85 to about 99.7 weight percent halogenated phosphoric acid ester flame retardant; wherein the weight ratio of (A) to (B) is from about 1:3 to about 3:1, and the weight ratio of (C) to (A) plus (B) is from about 1:6 to about 1.5:1.

The above mixture of essential ingredients may be added to the polyurethane reaction foam forming ingredients separately or together in any order prior to or during polyurethane foam formation. The flame retarding composition containing all essential ingredients is conveniently added to the polyurethane foam forming system at the time the foam is prepared.

The following Example illustrates the quantitative improvement in scorch related color change obtained by the use of the method and composition of this invention.

EXAMPLE

A polyurethane foam forming formulation of the following composition was prepared:

| Ingredients | Parts by Weight |
| --- | --- |
| 3000 MW polyether polyol (Niax 16-56)* | 100.0 |
| Halogenated phosphoric acid ester flame retardant | 12.0–15.0 |
| 80/20 tolylene diisocyanate | 67.5 |
| Water | 5.0 |
| Silicone surfactant (L5740)*, stabilizer | 1.1 |
| diazabicyclo-(2,2,2)-octane, catalyst | 0.1 |
| N—ethylmorpholine, catalyst | 0.2 |
| Stannous octoate, catalyst | 0.15 |
| Phenothiazine | Variable |
| 4,4'-thio-bis-(6-tertiary butyl meta cresol) | Variable |
| Organophosphite | Variable |

*Product of Union Carbide Corporation

Experimental Procedure:

After mixing the above formulation the incipient foam formulation was poured into a 30.48 cm by 30.48 cm by 13.97 cm cardboard box and allowed to rinse freely. At the completion of the rinse, the foam was placed in a microwave oven (Amana Touchmatic II Radarange Model RR-10) and heated for four minutes. Two different microwave heating levels were used in testing the foams of this Example. The heating level designated "low" is the same as that used in the Example of U.S. Pat. No. 4,324,865. The heating level designated "high" was used to obtain greater color differences ($\Delta E$) to enhance distinguishment of the lower scorch discoloration produced by the various additive compositions. The foam was thereafter removed from the oven and allowed to cool for thirty minutes. The foam bun formed by this procedure was sliced in the center perpendicular to the direction of rise and a 2.54 cm thick slice cut from the bun. A 5.08 cm by 5.08 cm sample from the slice was removed for the foam evaluation.

Foam Evaluation Procedure:

The Pacific Scientific Spectrogard Colorimeter (XL 835) was used to give a numerical rating to three color characteristics compared to a foam prepared without flame retardant. The color difference $\Delta E$ was calculated according to the equation:

$$\Delta E = (\Delta L^2 + \Delta a^2 + \Delta b^2)^{\frac{1}{2}}$$

where:
$\Delta E$ = color difference
$\Delta L$ = lightness compared to standard Δa=redness is positive, or greenness, if negative compared to a standard.

Δb=yellowness, if positive, or blueness, if negative, compared to a standard

The experimental procedure and foam evaluation procedure used in this Example is more fully described in the article, *A Rapid, Predictive Test for Urethane Foam Scorch*, by Michael J. Reale and Barry A. Jacobs in the Journal of Cellular Plastics, November/December 1979 (Vol. 15, No. 6) published by Technomic Publ. Co., Westport, Conn,; the text of which is incorporated herein by reference.

The test results are set out in the Table below:

| Sample No. | % Flame Retardant[1] | % Pheno-Thiazine[2] | % Thio-Cresol[3] | % Organo Phosphite | ΔE | Temp. Level |
|---|---|---|---|---|---|---|
| A | 0 | 0 | 0 | 0 | 1.73 | Low[11] |
| B | 15 | 0 | 0 | 0 | 37.61 | Low |
| C[4] | 15 | 0.2 | 0.2 | 0.2 | 11.29 | Low |
| D[4] | 12 | 0.2 | 0.2 | 0.2[5] | 11.1 | High[12] |
| E | 12 | 0.2 | 0.2 | 0.2[6] | 10.8 | High |
| F[4] | 12 | 0.2 | 0.2 | 0.2[7] | 10.9 | High |
| G[4] | 12 | 0.2 | 0.2 | 0.2[8] | 12.4 | High |
| H[4] | 12 | 0.2 | 0.2 | 0.2[9] | 12.5 | High |
| I[4] | 12 | 0.2 | 0.2 | 0.2[10] | 12.9 | High |
| J[4] | 12 | 0.2 | 0.2 | 0.2[5] | 10.0 | High |
| K[4] | 12 | 0.2 | 0.2 | 0 | 17.2 | High |
| L | 12 | 0 | 0 | 0 | 52.0 | High |

Footnotes to Table:
[1]To 2-propanol (1,3-dichlorophosphate) flame retardant is add-on weight percent based on 100 parts by weight of polyurethane forming ingredients.
[2]To phenothiazine based on weight of flame retardant.
[3]% 4,4'-thio-bis-(6-tertiary butyl meta cresol) based on weight of flame retardant.
[4]Contains 0.2 weight percent based on weight flame retardant of 3,4-epoxycycloalkyl 3,4 epoxycycloalkyl carboxylate acid acceptor.
[5]MARK ® 517 brand of alkyl aryl phosphite, product of Argus Chemical Corp.
[6]mono decyl diphenyl phosphite.
[7]MARK ® C brand of organophosphite, product of Argus Chemical Corp.
[8]didecyl monophenyl phosphite.
[9]triphenyl phosphite.
[10]Weston 425 brand organophosphite.
[11]"High" is setting of 6 on oven panel.
[12]"Low" is setting of 8 on oven panel.

Samples C, D, E, F, G, H, I, and J represent the practice of the invention. Samples A and B are control experiments for the low heat level scorch test. Samples K and L are control experiments for the high level scorch test.

In the first experimental series, sample A shows that foam without halogenated phosphoric acid ester flame retardant has a very low scorch level. Conversely, the use of flame retardant alone without additives (sample B) results in unacceptable color change. The discoloration of the foam is brought to an acceptable level by combined use of the essential phenothiazine, thio-cresol, and organophosphite ingredients in sample C.

The second experimental series: D, E, F, G, H, I, and J shows that the practice of the invention with a variety of phosphites gives acceptable scorch discoloration resistance in the presence of halogenated phosphoric acid ester flame retardant. Sample K absent organophosphite shows a relatively high color increase due to scorch. Sample L confirms that the high temperature level of the test gives pronounced color change if no additives are used with the flame retardant.

It is to be understood that although the invention has been described with specific references and specific details of embodiments thereof, it is not intended to be so limited since changes therein may be made which are within the full intended scope of this invention as defined by the appended claims.

I claim:

1. A method of making flame retardant polyurethane foams having improved scorch and surface discoloration properties by reacting an organic polyol and an organic isocyanate in the presence of a halogenated phosphoric acid ester flame retardant, phenothiazine, and 4,4'-thio-bis-(6-tertiary butyl meta cresol), wherein the improvement comprises: adding to the reaction an organophosphite in an amount effective to reduce scorch and surface discoloration.

2. The method of claim 1 wherein the phenothiazine, 4,4'-thio-bis-(6-tertiary butyl meta cresol, and organophosphite are each present in an amount of from about 0.1 to about 5.0 weight percent of the weight of halogenated phosphoric acid ester flame retardant.

3. The method of claim 2 wherein the weight ratio of phenothiazine to 4,4'-thio-bis-(6-tertiary butyl meta cresol) is from about 1:3 to 3:1, and the weight ratio of organophosphite to the sum of the weight of phenothiazine and 4,4'-thio-bis-(6-tertiary butyl meta cresol) is from about 1:6 to about 1.5:1.

4. The method of claim 1 wherein the halogenated phosphoric acid ester flame retardant is selected from the group consisting of:
tris(1,3-dichloropropyl)phosphate, tris(2,3-dibromopropyl)phosphate, dichloromethylene-bis(di-2-chloroethyl)phosphate, tris(2-chloroethyl)-phosphate, tris(2-chloropropyl)phosphate, 2,2-bis(-chloromethyl)-1,3propylene bis-di(2-chloroethyl)-phosphate, bis(dichloropropyl)tribromoneopentyl phosphate, tetrakis(2-chloroethyl)ethylene diphosphate, liquid poly(haloethylethyleneoxy)phosphoric acid ester which may be prepared by the reaction of ethanol, 2-chlorophosphate, P₂O₅ and ethylene, oxide, or mixtures thereof.

5. The method of claim 4 wherein the flame retardant is tris(dichloropropyl)phosphite.

6. The method of claim 1 wherein the organophosphite is selected from organophosphites represented by the formula:

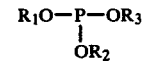

wherein $R_1$, $R_2$, and $R_3$ are the same or different and are each selected from hydrogen or hydrocarbyl organic radicals having 1 to about 20 carbon atoms, with the proviso that only one of $R_1$, $R_2$, or $R_3$ may be hydrogen.

7. The method of claim 6 wherein the organophosphite is selected from the group consisting of aryl phosphites, alkyl phosphites, alkylaryl phosphites, and mixtures thereof.

8. A polyurethane foam prepared by the process of claim 1.

9. A polyurethane foam prepared by the process of claim 3.

10. A polyurethane foam prepared by the process of claim 6.

11. A composition for flame retarding polyurethane foam comprising a mixture of the following ingredients:
(A) about 0.1 to about 5.0 weight percent phenothiazine;
(B) about 0.1 to about 5.0 weight percent 4,4'-thio-bis-(6-tertiary butyl metal cresol);
(C) to about 0.1 to about 5.0 weight percent organophosphite; and (D) about 85 to about 99.7 weight percent halogenated phosphoric acid ester flame retardant; wherein the weight ratio of (A) to (B) is from about 1:3 to about 3:1, and the weight ratio of (C) to (A) plus (B) is from about 1:6 to about 1.5:1.

12. The composition of claim 11 wherein the halogenated phosphoric acid ester flame retardant is selected from the group consisting of:

tris-(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(-chloromethyl)-1,3 propylene bis-di(2-chloroethyl)-phosphate, bis(dichloropropyl)tribromoneopentyl phosphate, tetrakis (2-chloroethyl)ethylene diphosphate, liquid poly(haloethylethyleneoxy)phosphoric acid ester which may be prepared by the reaction of ethanol, 2-chlorophosphate, $P_2O_5$ and ethylene oxide, or mixtures thereof.

13. The composition of claim 12 wherein the flame retardant is tris(dichloropropyl)phosphate.

14. The composition of claim 11 containing an acid accepting effective amount of an epoxide.

15. A method of making flame retardant polyurethane foams having improved scorch and surface discoloration properties by reacting an organic polyol and an organic isocyanate in the presence of the composition of claim 11.

16. A method of making flame retardant polyurethane foams having improved scorch and surface discoloration properties by reacting an organic polyol and an organic isocyanate in the presence of the composition of claim 13.

17. A method of making flame retardant polyurethane foams having improved scorch and surface discoloration properties by reacting an organic polyol and an organic isocyanate in the presence of the composition of claim 14.

* * * * *

UNITED STATES PATENT AND TRADEMARK OFFICE
CERTIFICATE OF CORRECTION

PATENT NO.   : 4,477,600
DATED        : October 16, 1984
INVENTOR(S)  : Gerald Fesman It is certified that error appears in the above—identified patent and that said Letters Patent is hereby corrected as shown below:

Col. 3, line 26, "1:5:1" should read -- 1.5:1 --.

Signed and Sealed this

Eleventh Day of June 1985

[SEAL]

Attest:

DONALD J. QUIGG

*Attesting Officer*     *Acting Commissioner of Patents and Trademarks*